Patented Apr. 7, 1953

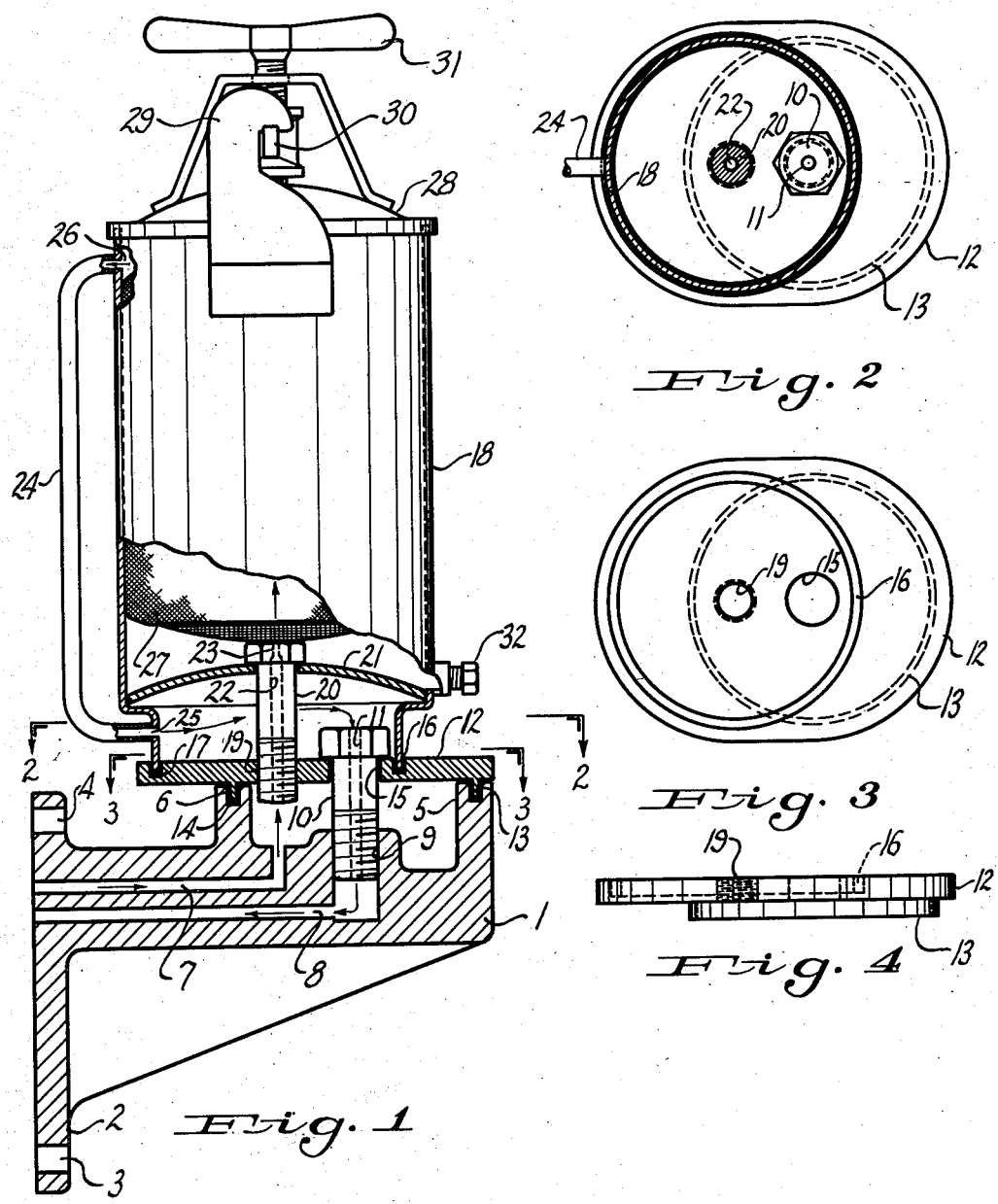

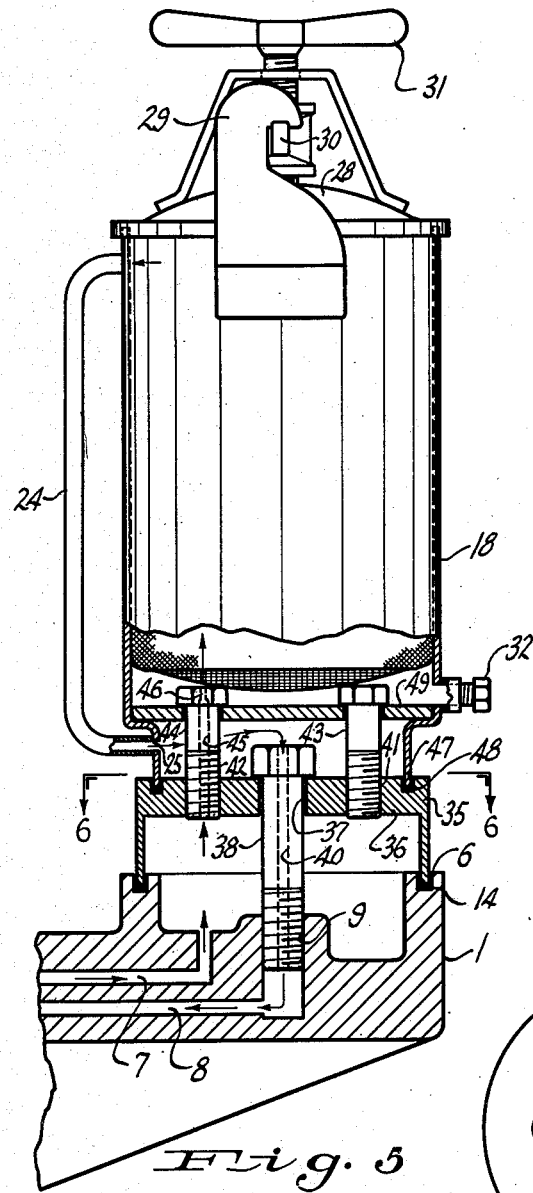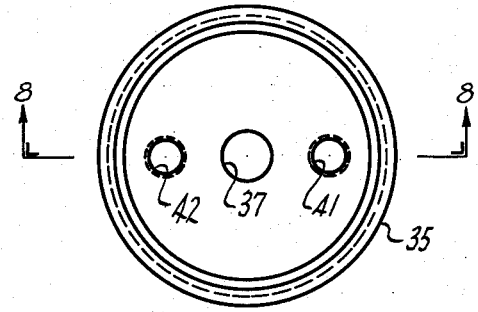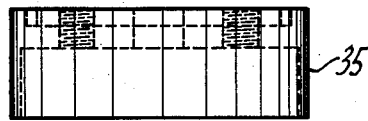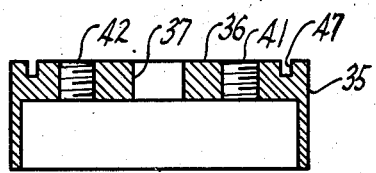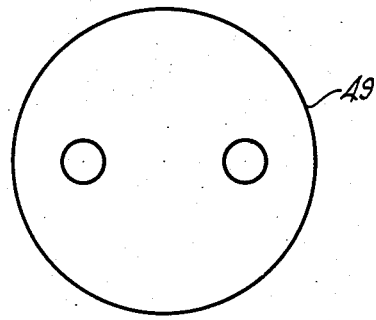

2,633,991

UNITED STATES PATENT OFFICE 2,633,991

MOUNTING BRACKET FOR OIL FILTERS

Joseph M. Beatty, Pittsburgh, Pa.

Application November 25, 1947, Serial No. 787,902

3 Claims. (Cl. 210—148)

This invention relates to new and useful improvements in mountings for oil filters on internal combustion engines, and more particularly to an adapter for mounting a central inflow, side outflow filter on a bracket designed for use with side inflow and central outflow filters.

It is among the objects of the invention to provide a simple and expedient means for adapting filter brackets which are especially designed for a side inflow filter mount to a central inflow filter mount to adapt both types of filters for use with a single style standard mounting bracket.

Heavy duty engines, such as diesels or engines used in bulldozers and road working machinery, utilize relatively large filters for filtering the lubricating oil of the engines. Such filters are mounted on special brackets secured to a wall of the engine having oil flow glands communicating with the interior of the engine, such brackets being designed for mounting filters of a kind wherein the high pressure oil from the engine is delivered to the side of the filter and thence from the side to the top of the filter passing through the filtering material and out through the center of the filter to the return gland.

In accordance with the present invention such standard mounting brackets are adapted for mounting filters in which the oil to be filtered is delivered at the center and bottom of the filter and passes upwardly through the filtering material, returning from the top through a side passage back to the mounting bracket and through the return flow gland to the engine.

The invention will become more apparent from a consideration of the accompanying drawings, constituting a part hereof, in which like reference characters designate like parts, and in which:

Fig. 1 is a side elevational view, partially in section, of an engine mounting bracket and filter embodying the principles of this invention;

Fig. 2 a cross sectional view taken along the line 2—2, Fig. 1;

Fig. 3 a similar view taken along the line 3—3, Fig. 1;

Fig. 4 a side elevational view of an adapter plate;

Fig. 5 a side elevational view, partially in section, of a modified form of filter mount;

Fig. 6 a cross sectional view taken along the line 6—6, Fig. 5;

Fig. 7 a side elevational view of an adapter plate;

Fig. 8 a vertical section of the plate of Fig. 7 taken through the center thereof; and Fig. 9 a top plan view of the adapter plate of Figs. 7 and 8.

With reference to Figs. 1 to 4 inclusive of the drawings, the structure therein illustrated comprises a filter mounting bracket 1 having a mounting flange 2 with holes 3 and 4 for bolting to the side wall of an internal combustion engine. The bracket 1 is provided with an annular wall 5 having an annular groove 6 and is further provided with glands 7 and 8 communicating with the high and low pressure side, respectively, of the lubricating system of the internal combustion engine, the arrows designating the direction of flow of the lubricating oil from the engine through the gland 7 to a filter and the return flow from the filter to the engine.

The gland 8 terminates in a threaded opening 9 for receiving a bolt 10 which is provided with a flow passage 11. An adapter plate 12 having an annular depending flange 13 is mounted on the bracket 1 with the flange 13 seating against a sealing gasket 14 placed in the annular groove 6. The adapter plate 12 is provided with a bore 15 through which the bolt 10 passes for clamping the adapter plate 12 to the bracket 1 in the manner shown.

The adapter plate 12 is provided with an annular groove 16 having a sealing gasket 17 for receiving the lower peripheral edge of an oil filter housing 18. The adapter plate 12 is provided with a threaded opening 19 for receiving a bolt 20 which extends through the base 21 of the filter 18 to clamp the filter to the adapter plate 12 as shown. The bolt 20 is provided with a flow passage 22 which is constricted as shown at 23 for a purpose to be hereinafter explained.

The filter 18 is provided with a return flow line 24 opening at 25 to a chamber formed between the adapter 12 and filter base 21, and the other end of the bypass 24 opens into the top of the filter 18 as shown at 26.

The filter is charged with a bag 27 of a filter mass such as steel wool or other comminuted inert materials, the bag being charged at the top and the filter is closed by a cover 28 by a clamping arrangement consisting of the side lugs 29, a clamping bar 30 and a wing screw 31 in the conventional manner. A drain plug 32 is provided at the bottom of the filter 18 to remove any sludge accumulating above the base plate 21.

By means of the above described filter mount the lubricating oil of the engine is delivered through gland 7, as indicated by the arrow, into the chamber constituted by the annular wall and the adapter plate 12, from which it flows upward through opening 22 of bolt 20 into the chamber of the filter 18. The oil being under pressure, passes through the filter mass upward to the outlet 26, thence through the bypass 24 to the outlet 25 of the chamber constituted by the adapter plate 12 and the base wall 21 of the filter housing. It then passes through the opening 11 of bolt 10 down through the gland 8 and back to the engine. In this manner the type of filter shown, having the inflow from the bottom to the top with the return along the side, may be adapted for use on the bracket 1 which is designed for a type of filter in which the inflow is through a bypass to the top of the filter and the return from the base at the center of the filter.

Instead of the offset type of adapter plate as shown in Figs. 2 to 4 of the drawings, the same mounting bracket 1 may be utilized for the same type of filters, like the filter 18 of Fig. 1, by still another type of adapter plate as shown in Figs. 5 to 9 of the drawings. The plate consists of a sleeve 35 provided with a heavy wall 36, the sleeve seating in the groove 6 of the bracket 1 on a gasket 14. The adapter plate is provided with a central opening 37 for receiving a bolt 38 having a threaded end interacting with the threaded opening 9 of the mounting bracket 1. Bolt 38 is provided with an oil flow passage 40 as shown in dotted lines.

The adapter plate 35 is provided with threaded openings 41 and 42 for receiving bolts 43 and 44, respectively, the bolt 44 having an oil flow passage 45 with a restriction 46. The adapter plate 35 is provided with an annular groove 47 for receiving the bottom peripheral edge of the filter 18, the filter seating on a sealing gasket 48. Filter 18 is provided with a clamping plate 49 having openings for receiving bolts 43 and 44 by which the filter is clamped securely on the adapter plate 35 in the manner shown in Fig. 5. The flow of oil through the filter 18 in the manner of mounting of Fig. 5 is as follows:

It is delivered under pressure from the engine through gland 7 passing into the chamber between the adapter sleeve 35 and the bracket 1, thence through the flow passage 45 of bolt 44 to the bottom of the filter, from which it passes upwardly and out at the top through the bypass 24, returning through the outlet 25 to the chamber constituted by the wall of the filter, the adapter plate 35 and the clamping plate 49. The oil then flows through the opening 40 of the clamping bolt 38 to the return gland 8 and to the engine.

It will be apparent from the above described filter mounts that adapter plates and clamping bolts with oil flow glands as described therein will make both the central inflow and side outflow, or side inflow and central outflow type of filters usable on standard engine mounts by the use of the adapter plates, which for one type of filter may be removed by the removal of the adapter plate clamping bolts 10 of Fig. 1 and 38 of Fig. 5. These same bolts are utilized as the center clamping bolt, such as the bolt 20 of Fig. 1, for clamping the filters direct to the mounting brackets when the side inflow and bottom outflow type of filters are employed. In the latter type, the additional bolts shown in Figs. 1 and 5 of the drawings are, of course, eliminated.

Although several embodiments of the invention have been herein illustrated and described, it will be evident to those skilled in the art that various modifications may be made in the details of construction without departing from the principles herein set forth.

I claim:

1. A mounting bracket for oil filters for internal combustion engines having a grooved annular wall for receiving the flanges of an adapter plate, said mounting bracket having a high pressure oil flow gland extending within the annular wall at one side thereof, a low pressure oil flow gland extending centrally of said annular wall through said bracket, an adapter plate mounted on the annular wall having a depending flange seated in the groove of said wall and having an annular groove in the top face thereof for receiving the lower peripheral edge of a filter housing, a clamping bolt extending through the adapter plate into a threaded opening of the mounting bracket having a flow passage communicating with the low pressure oil flow gland, said adapter plate being further provided with a threaded opening for receiving a clamping bolt extending through the base of the oil filter for securely mounting the filter thereon, said bolt having an oil flow passage communicating with the chamber formed between the annular walls of the mounting bracket and the adapter plate for receiving the high pressure oil and delivering the same to the inner filter chamber, the base of the filter and the adapter plate forming with the filter wall an outlet chamber, and a return flow connection extending from the top of the filter to said outlet chamber below the filter wall to deliver filter oil through the opening in the first-named clamping bolt to the engine.

2. The combination with a bracket for mounting oil filters on internal combustion engines, of an adapter plate therefor, said bracket having glands leading to the high and low pressure side of the lubricating system of the engine and having an annular groove at the seating surface thereof, said adapter plate having an annular depending tongue for seating in the groove of the bracket and having a groove in the upper face thereof for receiving a depending flange of a filter housing, the filter housing mounted on said adapter plate having a base plate spaced from the adapter plate to form an outlet chamber, a flow line connecting the outlet chamber with the top of the filter housing to return the filtered oil to said outlet chamber, said mounting bracket having a threaded opening in alignment with the low pressure gland of the bracket and said adapter plate having an opening for receiving a bolt, the bolt extending through said adapter plate opening in screw threaded engagement with the threaded opening on said bracket, said adapter plate having a threaded opening in alignment with the high pressure gland of said bracket and a bolt extending through the base plate of the filter in screw thread engagement with the threaded opening of said adapter plate, said bolts having flow passages for the engine oil to direct the oil from the engine through the high pressure gland into the filter housing and from the top of the filter through the flow line to the low pressure gland of the mounting bracket.

3. The combination with a bracket for mounting on a wall of internal combustion engines, of an adapter plate for mounting an oil filter, said adapter plate having a circular groove, a filter housing having a constricted bottom portion forming a shoulder and a depending flange for seating in said groove, a base plate seated on the shoulder of the filter housing forming an outlet chamber above said adapter plate, a flow line connecting said outlet chamber with the top of the filter housing, a hollow bolt extending through the base plate and adapter plate and a hollow bolt connecting the adapter plate to the mounting bracket, said mounting bracket having an oil flow gland for connection with the high pressure side of the engine lubricating oil to deliver oil through the first named bolt to the filter and having an oil gland for returning the filtered oil from the outlet chamber through the second-named bolt to the low pressure side of the engine lubricating oil.

JOSEPH M. BEATTY.

REFERENCES CITED

The following references are of record in the file of this patent:

UNITED STATES PATENTS

| Number | Name | Date |
|---|---|---|
| 2,031,589 | Burckhalter et al. | Feb. 25, 1936 |
| 2,076,934 | Burckhalter | Apr. 13, 1937 |
| 2,098,725 | Hurn | Nov. 9, 1937 |
| 2,188,745 | Wagner | Jan. 30, 1940 |
| 2,203,668 | Burckhalter | June 11, 1940 |
| 2,253,686 | Burckhalter | Aug. 26, 1941 |
| 2,271,054 | Williams | Jan. 27, 1942 |
| 2,275,481 | Wilkinson | Mar. 10, 1942 |